United States Patent

Schwarze et al.

[11] 4,083,872
[45] Apr. 11, 1978

[54] N-2,3-DIHYDROXYPROPYL-N-2-HYDROXY-ALKYL-AMINE AND ITS SALTS

[75] Inventors: Werner Schwarze, Frankfurt; Wolfgang Merk; Volker Binder, both of Hanau, all of Germany

[73] Assignees: Deutsche Gold- und Silber-Scheideanstalt vormals Roessler, Frankfurt; Henkel Kommandit- Gesellschaft auf Aktien (Henkel KGaA), Dusseldorf-Holthausen, both of Germany

[21] Appl. No.: 653,835

[22] Filed: Jan. 30, 1976

[30] Foreign Application Priority Data

Jan. 31, 1975 Germany .............................. 2504053

[51] Int. Cl.$^2$ ...................... C07C 91/02; C07C 87/30; C07C 87/29; C07C 91/06
[52] U.S. Cl. ......................... 260/584 R; 260/45.9 R; 260/567.6 M; 260/570.5 R; 260/570.5 P; 260/570.9
[58] Field of Search ............ 260/584 B, 584 R, 501.1, 260/DIG. 19; 44/DIG. 2

[56] References Cited

U.S. PATENT DOCUMENTS

| | | | |
|---|---|---|---|
| 2,195,194 | 3/1940 | Ulrich et al. ................ | 260/584 B X |
| 2,856,363 | 10/1958 | Brennan ....................... | 260/584 R X |
| 2,884,459 | 4/1959 | Kirkpatrick et al. ............ | 260/584 R |
| 2,891,028 | 6/1959 | Coler et al. .................. | 260/DIG. 19 |
| 2,930,761 | 3/1960 | Charret ....................... | 260/584 B X |
| 2,944,030 | 7/1960 | Patton ........................ | 260/584 R X |
| 3,317,505 | 5/1967 | Braus ......................... | 260/DIG. 19 |
| 3,365,435 | 1/1968 | Adams et al. ................. | 260/584 R |
| 3,371,130 | 2/1968 | Seifert et al. ............ | 260/DIG. 19 X |
| 3,395,137 | 7/1968 | Reinol et al. .............. | 260/DIG. 19 |
| 3,697,423 | 10/1972 | Sundry et al. ................. | 260/584 R |
| 4,021,539 | 5/1977 | Müller et al. ................ | 260/584 R X |

Primary Examiner—Daniel E. Wyman
Assistant Examiner—John J. Doll
Attorney, Agent, or Firm—Cushman, Darby & Cushman

[57] ABSTRACT

There are prepared compounds of the formulae

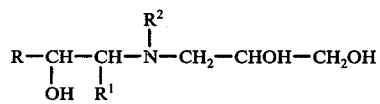

and

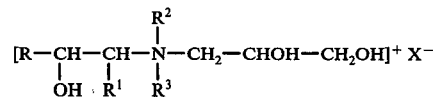

where R and R$^1$ are saturated alkyl groups in which the sum of the carbon atoms in the two alkyl groups is 4 to 30 carbon atoms and wherein one of R and R$^1$ can be hydrogen, R$^2$ is hydrogen, lower alkyl with one to five carbon atoms, 2-hydroxyethyl, 2-hydroxypropyl, 2,3-dihydroxypropyl, benzyl, o-,m- or p-methylbenzyl, o-,m- or p-chlorobenzyl, o-,m- or p-bromobenzyl, aminoalkyl (C$_2$ to C$_6$), preferably aminoalkyl (C$_2$ and C$_3$), alkyl (C$_1$ to C$_5$)-aminoalkyl (C$_2$ to C$_6$), 2-hydroxyethyl-aminoalkyl (C$_2$ to C$_6$), 2-hydroxypropyl-aminoalkyl (C$_2$ to C$_6$) or 2,3-dihydroxy-propyl-aminoalkyl (C$_2$ to C$_6$), R$^3$ in case the compound is present as the ammonium salt is hydrogen or a lower alkyl group with 1 to 5 carbon atoms, and X- is a monovalent, inorganic or organic acid group or one equivalent of a polybasic inorganic or organic group.

The compounds are useful as antistatic finishing agents for thermoplastic synthetic resins.

1 Claim, No Drawings

N-2,3-DIHYDROXYPROPYL-N-2-HYDROXYALKYL-AMINE AND ITS SALTS

The present application is related to our copending application Ser. No. 653,834 filed on even date and entitled "Antistatic Agents For Thermoplastic Synthetic Resins" claiming the benefit of German application P 2504054.4-43. The entire disclosure of the copending United States application is hereby incorporated by reference and relied upon.

The present invention is directed to N-2,3-dihydroxypropyl-N-2'-hydroxyalkyl amines of the formula

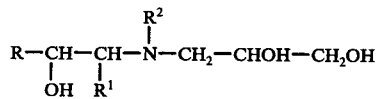

and

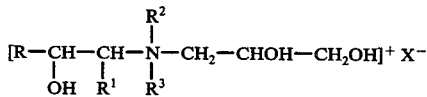

where R and $R^1$ are saturated alkyl groups in which the sum of the carbon atoms in the two alkyl groups is 4 to 30 carbon atoms and wherein one of R and $R^1$ can be hydrogen, $R^2$ is hydrogen, lower alkyl with one to five carbon atoms, 2-hydroxyethyl, 2-hydroxypropyl, 2,3-dihydroxypropyl, benzyl, o-, m- or p-methylbenzyl, o-, m- or p-chlorobenzyl, o-, m- or p-bromobenzyl, aminoalkyl ($C_2$ to $C_6$), preferably aminoalkyl ($C_2$ and $C_3$), alkyl ($C_1$ to $C_5$)-aminoalkyl ($C_2$ to $C_6$), 2-hydroxyethyl-aminoalkyl ($C_2$ to $C_6$), 2-hydroxypropyl-aminoalkyl ($C_2$ to $C_6$) or 2,3-dihydroxy-propyl-amino alkyl ($C_2$ to $C_6$), $R^3$ in case the compound is present as the ammonium salt is hydrogen or a lower alkyl group with 1 to 5 carbon atoms, and X- is a monovalent, inorganic or organic acid group or one equivalent of a polybasic inorganic or organic acid group, especially the anions $CH_3SO_4$—, $C_2H_5SO_4^-$, $ClO_4^-$, $R^5$—COO— [where $R^5$ is H, alkyl ($C_1$, $C_2$ or $C_3$), $CH_2OH$, $CH_3CHOH$ or $C_6H_5$], $NO_3^-$, $Cl^-$, $R^6SO_3^-$ [where $R^6$ is $CH_3$, $C_6H_5$,

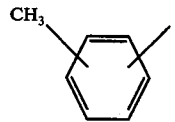

or $(HO)C_2H_4$] or an equivalent of the anions $SO_4^=$, $HPO_4^=$ or $R^7$ $(COO)_2^=$ [where $R^7$ is a simple direct bond, —$(CH_2)_x$— where X is 1 to 4, —CH=CH—, —CH(OH)—CH(OH)—, —$CH_2$—C(OH)(COOH—$CH_2$— or

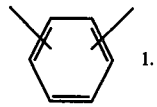

The named groups R and $R^1$ are preferably linear alkyl groups having preferably a total of 4 to 20 carbon atoms. The new compounds are excellent antistatic agents for thermoplastic synthetic resins whether used as individual chemicals, as mixtures with each other, or as mixtures with silica or silica gel, especially pyrogenically produced, preferably pure highly dispersed, silica. Preferably they are employed in the synthetic resins as so-called internal antistatic agents. As starting materials there are used terminal or inner epoxide which are easily accessible from industrial olefins. Thus, there can be used 1,2-epoxides such as 1,2-epoxyhexane, 1,2-epoxyoctane, 1,2-epoxynonane, 1,2-epoxydecane, 1,2-epoxydodecane, 1,2-epoxyhexadecane, 1,2-epoxyoctadecane, 1,2-epoxyeicosane, 1,2-epoxytetracosane, 1,2-epoxytriacontane, 2,3-epoxydodecane, 5,6-epoxydodecane, 7,8-epoxyoctadecane, 9,10-epoxyoctadecane, 10,11-epoxyeicosane.

These 1,2-epoxides can be converted to hydroxylamines by reaction with ammonia or short chain aliphatic amines such as alkyl amines, e.g., methyl amine, ethyl amine, propyl amine, isopropyl amine, butyl amine, sec. butyl amine, t-butyl amine, amyl amine, as well as other aliphatic amines, aralkyl amines and haloaralkyl amines, such as ethanolamine, 2-hydroxypropyl amine, 2,3-dihydroxypropyl amine, benzyl amine, o-methylbenzyl amine, m-methylbenzyl amine, p-methylbenzyl amine, o-chlorobenzyl amine, m-chlorobenzyl amine, p-chlorobenzyl amine, o-bromobenzyl amine, m-bromobenzyl amine, p-bromobenzyl amine, ethylene diamine, propylene diamine, trimethylene diamine, tetramethylene diamine, pentamethylene diamine, hexamethylene diamine, N-methyl ethylene diamine, N-ethyl ethylene diamine, N-amyl ethylene diamine, N-methyl trimethylene diamine, N-methyl hexamethylene diamine, N-(2-hydroxyethyl)ethylene diamine, N-(2-hydroxyethyl) trimethylene diamine, N-(2-hydroxyethyl) hexamethylene diamine, N-(2-hydroxypropyl) ethylene diamine, N-(2-hydroxypropyl) trimethylene diamine, N-(2-hydroxypropyl) hexamethylene diamine, N-(2,3-dihydroxypropyl) ethylene diamine, N-(2,3-dihydroxypropyl) trimethylene diamine, and N-(2,3-dihydroxypropyl) hexamethylene diamine. Corresponding dialkylamines can also be used, e.g., dimethyl amine, diethyl amine, dipropyl amine, dibutyl amine, diamyl amine, methylethyl amine, etc.

The reaction of ammonia or aliphatic amines with 1,2-epoxides to form primary, secondary or tertiary hydroxylamines is shown, for example in K. Shibata and S. Matsuda, Bull. Jap. Petrol. Inst., Vol. 7, pages 25–30 (1965). The entire disclosure of Shibata et al is hereby incorporated by reference and relied upon.

The compounds thus prepared can then be reacted with glycidol in the manner described, for example, by E. Ulsperger and R. Dehns, J. Prakt. Chemo, Vol. 27, pages 195–212 (1965) for reacting fatty amines with glycidol. The entire disclosure of Ulsperger et al is also hereby incorporated by reference and relied upon.[x]

[x] Generally spoken, compounds of the formula III R—CHOH—$CHR^1$—$NHR^2$ are reacted with glycidol (R, $R^1$ and $R^2$ having the same meaning as stated above).

As occasion demands, the thus produced secondary and tertiary amines can be neutralized wth preferably inorganic acids but also organic acids to obtain the salts. Thus, there can be used for example, nitric acid, perchloric acid, hydrochloric acid, hydrobromic acid, sulfuric acid, phosphoric acid, dimethyl sulfate, diethyl sulfate, dibutyl sulfate, diamyl sulfate, etc. or organic acids such as formic acid, acetic acid, propionic acid, butyric acid, lactic acid, glycolic acid, benzoic acid, oxalic acid, malonic acid, succinic acid, glutaric acid, adipic acid, maleic acid, fumaric acid, tartaric acid, citric acid, phthalic acid, isophthalic acid, terephthalic acid, methanesulfonic acid, benzenesulfonic acid, p-toluenesulfonic acid, o-toluene-sulfonic acid, hydroxyethanesulfonic acid. The particular acid is not critical. In the case of the above named tertiary hydroxyamines these are dissolved in water containing organic solvents, reacted with glycidol to form their quaternary ammonium hydroxides and then these likewise converted to the above named salts. In this connection the water content of the solvent as for example, alcohols (e.g., methyl alcohol, ethyl alcohol, propyl alcohol, isopropyl alcohol, etc.), ketones, (e.g., acetone or methyl ethyl ketone) and the like so high that the hydroxyamines added are at least partially soluble in the mixture at the reaction temperature, preferably at the boiling point of the water containing organic solvent.

The new compounds for the most part are light, clear, viscous liquids without disturbing odors or are crystalline solids with definite melting points.

The invention is also directed to a process for the production of the N-2,3-dihydroxypropyl-N-2'-hydroxyalkylamines and their salts. This process is characterized by first reacting in known manner ammonia, a primary or secondary alkyl or dialkyl ($C_2$ to $C_6$, preferably $C_2$ or $C_3$) amine with a terminal or inner 1,2-epoxide having straight or branched carbon chains with 4 to 30 carbon atoms, preferably 4 to 20 carbon atoms, in the hydrocarbon group, at temperatures from 0° to 300° C, in a given case with pressure (although this is not essential) in an organic solvent, then reacting the resultant reaction mixture, (in a given case after removal of the solvent, and also in a given case after rectification), dissolved in an organic solvent with glycidol, preferably at the boiling point of the solvent, removing the solvent by distillation and in a given case converting the N-2,3-dihydroxypropyl-N-2'-hydroxyalkyl amine into a salt with an organic or inorganic acid or a mixture of acids, in a given case after the purification of the N-2,3-dihydroxypropyl-N-2'-hydroxyalkylamine by rectification or the like, on the condition that in obtaining the tertiary amines from the secondary amines the solution is taken up in a mixture of water and an organic solvent, reacted with glycidol, preferably at the boiling point (although heating at lower temperatures can be used), the reaction mixture neutralized with an organic or inorganic acid or a mixture of acids and the solvent removed by distillation.

The invention is also directed to the use of the new 2,3-dihydroxypropyl-N-2'-hydroxyalkyl amines and their salts, in a given case and frequently advantageously mixed with silica and/or thermoplastic synthetic resins, as agents for the antistatic finishing of thermoplastic synthetic resins.

The excellent antistatic effect of the new compounds in thermoplastic synthetic resins is particularly surprising because similarly constructed known compounds produce substantially poorer results. For comparison, there were tested under otherwise equal conditions the compounds of Braus, U.S. Pat. No. 3,308,111, Braus, U.S. Pat. No. 3,317,505 and Adams, U.S. Pat. No. 3,365,435 with the result that they had a much weaker effect. Funatsu German Offenlegungsschrift No. 1,694,525 points out that alkyl bis (hydroxyethyl) amines, e.g., stearyl di(hydroxyethyl) amine, when incorporated alone in high pressure polyethylene have very poor antistatic activity with a surface resistance of $\geq 10^{13}$. A similar result for antistatic effect was observed in Higuchi German Offenlegungsschrift No. 2332277 with other di(hydroxyalkyl amines which also had another hydroxyalkoxy-alkyl group attached to the amino nitrogen atoms. The Higuchi products were made by a different procedure than that used by Funatsu.

Unless otherwise indicated, all parts and percentages are by weight.

EXAMPLES OF PREPARING THE COMPOUNDS (Analytical results are given in percent by weight)

1. N-methyl-N-(2,3-dihydroxypropyl)-N-(2'-hydroxydodecyl)-amine.

Two-thousand one-hundred and seventy grams of methylamine were introduced into 4550 ml of methanol at room temperature, whereupon there were dropped in 1288 grams of 1,2-epoxydodecane within 30 minutes at 20° C with stirring and water cooling and the mixture was allowed to stand for 24 hours with occasional stirring. After drawing off the excess methanol the residue was rectified. There were obtained 1284 grams (85.3% of theory) of N-methyl-N-(2-hydroxydodecyl) amine having a boiling point at 0.4 mm Hg of 130° C and a melting point of 67°–68° C.

One-thousand eighty grams of this material were then heated in 1740 ml of toluene to the boiling point and treated with stirring with 380 grams of glycidol within 1 hour. The mixture was allowed to react for another 2 hours under gentle boiling and then the toluene removed in a vacuum. There were obtained 1446 grams (99.7% of theory) of a colorless crystallizate having a melting point of 56°–57° C.

| Analysis | C | H | N |
|---|---|---|---|
| Calculated: | 66.37 | 12.23 | 4.84 |
| Found: | 66.15 | 12.34 | 4.79 |
| Empirical Formula: $C_{16}H_{35}O_3N$ | | | |

2. N,N-dimethyl-N-(2,3-dihydroxypropyl)-N-(2'-hydroxydodecyl) ammonium methyl sulfate.

14.5 grams of N-methyl-N-(2,3-dihydroxypropyl)-N-(2'-hydroxydodecyl) amine produced according to example 1 were dissolved in 50 ml of dioxane and treated with 6.3 grams of dimethyl sulfate at 60° C with stirring. The mixture was allowed to react further for one hour at 60° C and the dioxane removed in a vacuum. There were obtained as a residue 20.8 grams (100% of theory) of a yellowish, pasty material.

| Analysis | C | H | N | S |
|---|---|---|---|---|
| Calculated: | 52.5 | 10.0 | 3.37 | 7.71 |
| Found: | 52.37 | 9.77 | 3.52 | 7.92 |
| Empirical Formula: $C_{18}H_{41}O_7NS$ | | | | |

3. Inorganic salts of N-methyl-N-(2,3-dihydroxypropyl)-N-(2'-hydroxydodecyl) amine.

0.05 mole of N-methyl-N-(2,3-dihydroxypropyl)-N-(2'-hydroxydodecyl) amine were dissolved in 50 ml of isopropanol and treated under stirring with (a) 0.05 mole of nitric acid (65%), or (b) 0.05 mole of perchloric acid (70%), or (c) 0.025 mole of phosphoric acid (98%). After drawing off the solvent in a vacuum in each of (a), (b) and (c) there was obtained in almost quantitative yield the corresponding salt as a viscous, colorless to slightly yellow oil.

4. N-(2,3-dihydroxypropyl)-N-(2'-hydroxyoctyl) amine.

One-thousand one-hundred grams of ammonia gas was introduced into a mixture of 6 liters of ethanol and 1 liter of water and within 30 minutes there were dropped in at room temperature 320 grams of 1,2-epoxyoctane. The mixture was left at room temperature for 70 minutes under gentle stirring, then the solvent and excess ammonia drawn off and the residue rectified in a vacuum. There were obtained 277.6 grams (77.1% of theory) of 2-hydroxyoctyl amine having a boiling point (0.4 mm Hg) of 80° C.

108.8 grams of 2-hydroxyoctyl amine were dissolved in 500 ml of toluene, heated to reflux, treated within 10 minutes under stirring with 18.5 grams of glycidol and held at reflux for 2 hours. Subsequently, the solvent was drawn off and the excess amine distilled off in a vacuum. There were obtained as a residue 49.5 grams (90.5% of theory) of N-(2,3-dihydroxypropyl)-N-(2-hydroxyoctyl) amine which after recrystallization from ethylacetate gave colorless crystals having a melting point of 85°–90° C.

| Analysis | C | H | N |
| --- | --- | --- | --- |
| Calculated: | 60.27 | 11.52 | 6.39 |
| Found: | 60.54 | 11.83 | 6.78 |
| Empirical Formula: $C_{11}H_{25}O_3N$ | | | |

5. Production Of A Statistical $C_{11}$–$C_{14}$ Vicinal Hydroxyamine And Its Reaction With Glycidol.

An epoxidate obtained through the epoxidation of a mixture of olefins of chain length $C_{11}$ to $C_{14}$ with statistically distributed double bonds (iodine number 146) having an average molecular weight of 193 (titration of the epoxide against HBr in glacial acetic acid) was used as the starting material. Ninety-five grams of this epoxide were treated in a 1 liter shaking autoclave with 260 grams of aqueous ammonia (33%) and brought to reaction with shaking for 10 hours at 200° C. The phases were separated, the organic phase washed with water and dried over $Na_2SO_4$. A gas chromatographic control showed > 98% of reaction of the epoxide. A vacuum distillation gave 83.4 grams (86.8% of theory) of a colorless oil having a boiling range (0.2 mm Hg) of 80° to 130° C.

Molecular Weight

Theoretical 210 (based on the added epoxide)

Found 216 (titration of the amine against N/10 $HClO_4$)

Thirty grams of the hydroxyamine thus obtained were dissolved in 100 ml of toluene, heated to reflux and treated under stirring within 10 minutes with 20.7 grams of glycidol. The mixture was held for 2 hours at reflux and then the toluene was removed with the help of a rotary evaporator. There were obtained 49.5 grams (100% of theory) of a viscous oil.

Molecular Weight

Theoretical 364 (based on the amine added)

Found 365 (titration of the final product against N/10 $HClO_4$)

6. Salts of the N,N-dimethyl-N-(2,3-dihydroxypropyl)-N-(2'-hydroxydodecyl)-ammonium hydroxide.

Thirty-seven grams of N,N-dimethyl-N-(2-hydroxydodecyl) amine were dissolved in 335 ml of 70% aqueous ethanol, warmed to 70° C and at this temperature brought to reaction with 12.8 grams of glycidol. The mixture was subsequently stirred further for one hour at 70° C and cooled. The solution was diluted to 400 ml with ethanol and divided into two halves. The two portions were in each case neutralized to pH6 with (a) 67% aqueous nitric acid or (b) 70% of aqueous perchloric acid and the solvent removed in a vacuum. There were obtained (a) salt of nitric acid:

29.3 grams (100% of theory) of a light yellow jelly.

| Analysis | C | H | N |
| --- | --- | --- | --- |
| Calculated: | 55.74 | 10.49 | 7.65 |
| Found: | 55.49 | 10.53 | 7.51 |

Empirical Formula: $C_{17}H_{38}O_6N_2$, (b) salt of perchloric acid:

32.4 grams (100% of theory) of a honey yellow waxlike mass.

| Analysis | C | H | N | Cl |
| --- | --- | --- | --- | --- |
| Calculated: | 50.50 | 9.50 | 3.45 | 8.80 |
| Found: | 50.35 | 9.25 | 3.17 | 8.47 |

Empirical formula: $C_{17}H_{38}O_7NCl$

Further compounds according to the invention are for example, N-ethyl-N-(2,3-dihydroxypropyl)-N-(2'-hydroxyoctadecyl)-amine and its hydrochloride, N-n-Propyl-N-(2,3-dihydroxypropyl)-N-(2'-hydroxyhexadecyl)-amine and its perchlorate, N-i-Butyl-N-(2,3-dihydroxypropyl)-N-(2'-hydroxydecyl-amine and its formate, N-N-Pentyl-N-(2,3-dihydroxypropyl)-N-(2'-hydroxytetradecyl-amine and its acetate, N-(2-hydroxyethyl)-N-(2,3-dihydroxypropyl)-N-(2'-hydroxyeicosyl)-amine and its propionate, N,N-Bis-[2,3-dihydroxypropyl]-N-[2'-hydroxycosyl ($C_{22}$–$C_{26}$)]-amine and its nitrate, N-ethyl-N-methyl-N-(2,3-dihydroxypropyl)-N-(2'-hydroxydodecyl)-ammonium-methylsulfate, N-Isopropyl-N-methyl-N-(2,3-dihydroxypropyl)-N-(2'-hydroxydodecyl)-ammonium-methylsulfate, N-(2,3-Dihydroxypropyl)-N-(2'-hydroxydodecyl)-amine, N-Methyl-N-(2,3-dihydroxypropyl)-N-(2'-hydroxyoctyl)-ammonium-methyl-sulfate, N-Methyl-N-(2,3-dihydroxypropyl)-N-(2-hydroxyoctadecyl)-amine and its perchlorate as well as its sec. phosphate, N-Methyl-N,N-di-(2,3-dihydroxypropyl)-N-(2'-hydroxydodecyl)-ammonium-methylsulfate, statistical N,N-Dimethyl-N-(2',3'-dihydroxypropyl)-vic.hydroxy-$C_{11-14}$-alkylammonium-methylsulfate, N,N-Dimethyl-N-(2,3-dihydroxypropyl)-N-(2'-hydroxyoctyl)-ammoniumperchlorate, N,N-Dimethyl-N-(2,3-dihydroxypropyl)-N-(2'-hydroxydodecyl/tetradecyl)-ammonium-perchlorate and -nitrate, N,N-Dimethyl-N-(2,3-dihydroxypropyl-N-(2'-hydroxydodecyl)-ammonium-chloride, N-(vic. Hydroxy-statistical $C_{11-14}$-alkyl)-N,N-di-(2,3-dihydroxypropyl)-ethylene-diammonium-diperchlorate, N-Benzyl-N-(2,3-dihydroxypropyl)-N-(2'-hydroxyoctyl)-amine and its lactate, N-(2,3- or 4-methylbenzyl)-N-(2,3-dihydroxypropyl)-N-(2'-hydroxydodecyl)-amine and its succinate, N-(2-, 3- or 4-monochlorbenzyl)-N-(2,3-dihydroxypropyl)-N-(2'-hydroxyhexadecyl)-amine and its tartrate, N-(2-, 3- or 4-monobrombenzyl)-N-(2,3-dihydroxypropyl)-N-(2'-hydroxypentadecyl)-amine and its glycolate, N-ethylamino-N-(2,3-dihydroxypropyl)-N-(2'-hydroxyhexacosyl)-amine and its oxalate, N-ethylaminoethyl-N-(2,3-dihydroxypropyl)-N-(2'-hydroxyoctadecyl)-amine and its adipate, N-Methylamino-n-propyl-N-(2,3-dihydroxypropyl)-N-(2'-hydroxydodecyl)-amine and its maleate, N-(2-Hydroxyethyl-amino-ethyl)-N-(2,3-dihydroxypropyl)-N-(2'-hydroxyhexadecyl)-amine and its citrate, N-(2,3-Dihydroxypropylamino-hexyl)-N-(2,3-dihydroxypropyl)-N-(2'-hydroxydodecyl)-amine and its phthalate, N-(2-hydroxypropylamino-hexyl)-N-(2,3-dihydroxypropyl)-N-(2'-hydroxynonylamine and its benzene sulfonate, methanesulfonate as well as hydroxyethanesulfonate, N-(2-Hydroxypropyl)-N-(2,3-dihydroxypropyl)-N-[2'- hydroxyalkyl ($C_9$ to $C_{12}$)]-amine and its phthalate, isophthalate as well as terephthalate.

The new compounds are surprisingly effective as antistatic agents, particularly in thermoplastic synthetic resins, either alone or in admixture with silica ($SiO_2$) in amounts of from 1 to 500 parts by weight per 100 parts by weight of the antistatically active compound or compounds. An increase of the antistatic effect is produced in admixture with a highly dispersed silica which is obtained ina pyrogenic manner, for example by flame hydrolysis of silicon tetrachloride, and which has a specific surface area between 100 and 400 $m^2/g$ (measured by the BET procedure) and an average primary particle size in the range of 5 to 100, preferably 5 to 50 nm.

The new, especially antistatic active compounds can also be premixed with thermoplastic synthetic resins, thus, for example, and preferably, with a part of the synthetic resin later to be treated with the antistatic agent, namely in amounts of 0.1 to 20 parts by weight of antistatic agent per 100 parts by weight of thermoplastic synthetic resin. Thereby care is observed that there is a homogeneous distribution of the antistatic agent in the thermoplastic synthetic resin, and it is also possible to use several of the antistatically active compounds together. A further variety of using a preformed mixture consists of a mixture of at least one antistatically active compound in an amount of 0.1 to 20 parts by weight, a silicate filler, as for example, silica in an amount of 0.1 to 40 parts by weight and a thermoplastic synthetic resin in an amount of 100 parts by weight in uniform distribution with each other.

By way of nonlimiting example, the new antistatic agents of the invention can be used with thermoplastic synthetic resins such as polyolefins, e.g., poly-($\alpha$-olefins) such as polyethylene, polypropylene, ethylenepropylene copolymer, polystyrene, ethylenevinyl acetate copolymer, polyvinyl chloride, polymethyl methacrylate, chlorinated polyethylene, chlorinated polypropylene, acrylonitrile-styrene copolymer, polyacrylonitrile, acrylonitrile-vinyl acetate copolymer, acrylonitrile-vinyl chloride copolymer, vinylidene chloride-acrylonitrile copolymer, vinylidene chloride-vinyl chloride copolymer, polyvinylidene chloride, vinyl chloridevinyl acetate copolymer, polyvinyl acetate, polyvinyl acetals, polyvinyl ethers, polyvinyl ketones, nylon 6, nylon 6,6 nylon 6,10, nylon 11, nylon 12, linear polyesters, e.g., polyethylene terephthalate, linear polyurethanes, polyoxymethylene, polycarbonates, cellulose acetate, cellulose butyrate, cellulose acetate-propionate, cellulose acetatebutyrate, etc., as well as with polybutadienes.

It could not be foreseen that the new compounds especially in polymethyl methacrylate, would be such good antistatic agents. For example, in making cast polymethyl methacrylate glass they can be added with the catalyst to the methyl methacrylate monomer which is then polymerized and formed in conventional manner at elevated temperature. However, the compounds can also be mixed into a solution of polymethyl methacrylate in an organic solvent, for example, toluene, and thereby there is obtained an antistatically finished polymethyl methacrylate resin, which is outstandingly suitable for example, as a finishing lacquer for synthetic leather. The effective concentrations of the compounds of the invention in polymethyl methacrylate likewise are 0.01 to 5%, preferably 0.1 to 3%, based on the weight of the polymer.

The new compounds are also suitable as external antistatic agents, as well as being suited to be added to the monomer or polymer in the production of the synthetic resin products. They are effective on the surfaces of the synthetic resin products.

EXAMPLES OF USE

In the following examples of using the antistatic acting compounds of the invention there are recorded the antistatic properties.

EXAMPLE 1

One-hundred parts by weight of high pressure polyethylene (Lupolen 2000H of BASF) were thoroughly mixed with 0.25 parts by weight of an antistatic agent and homogenized on a two roll set of mixing rolls for 5 minutes at 125° C. The rolled sheet formed was comminuted and pressed at 150° C in a frame press to a 1 mm thick sheet within 8 minutes. The properties determined are set forth in the following Table 1.

The evaluation of the antistatic activity of the equipped synthetic resin was carried out by measuring the surface resistance according to DIN 53482 (German Industrial Standard 53482) with the Tera-Ohm-Meter, Type PM 6509 (manufacturer; Philips), whereby contacts of WTW (Wissenschaftlich technische Werkstatten in weilheim, Bavaria) of Type OFZ 3 were used. In each two measurements of the antistatic effect was carried out; the first immediately after the formation of the polyethylene sheet as a measure of the antistatic finishing in the processing state and the second after a conditioning time of 24 hours at 45% relative humidity as a measure of the speed of migration of the antistatic agent in the synthetic resin and as the final value of the antistatic activity.

Table 1

| Antistatic Agent | Surface Resistance (in Ohms) | |
|---|---|---|
| | As Formed | After Conditioning 24 hours at 45% rel. humidity |
| 1. None | $3.1 \times 10^{14}$ | $2.4 \times 10^{14}$ |
| 2. $CH_3-(CH_2)_9-\underset{OH}{CH}-CH_2-\underset{CH_3}{N}-CH_2-\underset{OH}{CH}-CH_2OH$ | $3 \times 10^{10}$ | $7 \times 10^8$ |
| 3. The same as 2 + 0.02% pyrogenic silica (Aerosil 200) | $6 \times 10^9$ | $4 \times 10^9$ |
| 4. $CH_3-(CH_2)_{9-11}-\underset{OH}{CH}-CH_2-\underset{CH_3}{N}-CH_2-\underset{OH}{CH}-CH_2OH$ | $8 \times 10^{11}$ | $4 \times 10^9$ |
| 5. $CH_3-(CH_2)_5-\underset{OH}{CH}-CH_2-NH-CH_2-\underset{OH}{CH}-CH_2OH$ | $1 \times 10^{11}$ | $3 \times 10^{10}$ |

Table 1-continued

| Antistatic Agent | Surface Resistance (in Ohms) | |
|---|---|---|
| | As Formed | After Conditioning 24 hours at 45% rel. humidity |
| 6. $CH_3-(CH_2)_9-\underset{\underset{OH}{\vert}}{CH}-CH_2-NH-CH_2-\underset{\underset{OH}{\vert}}{CH}-CH_2OH$ | $3 \times 10^{12}$ | $3 \times 10^{10}$ |
| 7. $C_nH_{2n+1}-\underset{\underset{OH}{\vert}}{CH}-\underset{\underset{N(CH_2-\underset{\underset{OH}{\vert}}{CH}-CH_2OH)_2}{\vert}}{CH}-C_mH_{2m+1}$ | $1 \times 10^{10}$ | $7 \times 10^{10}$ |
| $\left\{\begin{array}{l}n + m = 9\ \text{to 12 (compound prepared according}\\ \text{preparation 5)}\end{array}\right.$ | | |
| Comparison Measurements (State of the Art) | | |
| 8. $C_{10}H_{21}\underset{\underset{OH}{\vert}}{CH}-CH_2-N(C_2H_4OH)_2$ (According to US-PS 3 365 435 and US-PS 3 317 505) | $>1 \times 10^{13}$ | $>1 \times 10^{13}$ |
| 9. $CH_3-(CH_2)_{9-11}-\underset{\underset{OH}{\vert}}{CH}-CH_2-N\overset{\diagup\diagdown}{\underset{\diagdown\diagup}{\phantom{X}}}O$ According to US-PS 3 308 111) | $2 \times 10^{14}$ | $9 \times 10^{13}$ |

EXAMPLE 2

One-hundred parts by weight of a hard polyvinyl chloride (PVC) mixture [from 100 parts by weight of polyvinyl chloride of the type SOLVIC 229 of Solvay, Belgium, 0.5 parts by weight of a liquid dibutyl-tin-mercaptide stabilizer (Irgastab® 17M of Ciba-Geigy A.G.), 2.0 parts by weight of a liquid glycerol partial ester as a lubricant (Bärolup® LPL of Chemische Werke Müchen Otto Bärlocher Gmb) and 0.3 parts by weight of stearic acid] were mixed in each case with one part by weight of antistatic agent and homogenized for five minutes at 180° C on a two roll mixing roll. The mixture was subsequently pressed in a frame press at 195° C to 1 mm thick sheets and the measurements carried out thereon, see Table 2.

The measurement of the antistatic activity according to DIN 53482 again was carried out both immediately and after conditioning at 45% relative humidity.

Table 2

| Antistatic Agent | Surface Resistance (in Ohms) | |
|---|---|---|
| | As Formed | After Conditioning 24 hours at 45% rel. humidity |
| 1. None | $4 \times 10^{14}$ | $5 \times 10^{14}$ |
| $CH_3-(CH_2)_9-\underset{\underset{OH}{\vert}}{CH}-CH_2-\underset{\underset{CH_3}{\vert}}{N}-CH_2-\underset{\underset{OH}{\vert}}{CH}-CH_2OH$ | $2 \times 10^{11}$ | $5 \times 10^{10}$ |
| $[CH_3-(CH_2)_9-\underset{\underset{OH}{\vert}}{CH}-CH_2-\underset{\underset{C_2H_5}{\vert}}{\overset{\overset{CH_3}{\vert}}{N}}-CH_2\underset{\underset{OH}{\vert}}{CH}-CH_2OH]^+$ $SO_4CH_3^-$ | $5 \times 10^{11}$ | $7 \times 10^{10}$ |
| $[CH_3-(CH_2)_9-\underset{\underset{OH}{\vert}}{CH}-CH_2-NH-\underset{\underset{CH_3}{\vert}}{CH_2}-\underset{\underset{OH}{\vert}}{CH}-CH_2OH]^+$ $ClO_4^-$ | $1 \times 10^{10}$ | $3 \times 10^{10}$ |
| $[CH_3-(CH_2)_9-\underset{\underset{OH}{\vert}}{CH}-CH_2-\underset{\underset{CH_3}{\vert}}{\overset{\overset{CH_3}{\vert}}{N}}-CH_2-\underset{\underset{OH}{\vert}}{CH}-CH_1OH]^+$ $ClO_4^-$ | $2 \times 10^{10}$ | $3 \times 10^9$ |
| $CH_3-(CH_2)_9-\underset{\underset{OH}{\vert}}{CH}-CH_2-N(CH_2\underset{\underset{CH_3}{\vert}}{CH}-CH_2OH)_2]^+$ $CH_3SO_4^-$ | $3 \times 10^{10}$ | $4 \times 10^{10}$ |
| $[CH_3-(CH_2)_{15}-\underset{\underset{OH}{\vert}}{CH}-CH_2-NH-\underset{\underset{CH_3}{\vert}}{CH_2}-\underset{\underset{OH}{\vert}}{CH}-CH_2OH]^+$ $ClO_4^-$ | $2 \times 10^{10}$ | $2 \times 10^{10}$ |

Table 2-continued

| Antistatic Agent | Surface Resistance (in Ohms) As Formed | After Conditioning 24 hours at 45% rel. humidity |
|---|---|---|
| $[CH_3-(CH_2)_{15}-\underset{OH}{CH}-CH_2-NH-CH_2-\underset{CH_3}{CH}-\underset{OH}{CH_2OH}]_2^{2+}$  $HPO_4^{2-}$ | $2 \times 10^{10}$ | $2 \times 10^{10}$ |
| $[C_mH_{2m+1}-\underset{OH}{CH}-\underset{NH(CH_2-\underset{OH}{CH}-CH_2OH)_2}{CH}-C_nH_{2n+1}]^+$  $ClO_4^-$  m + n = 9 to 12 | $1 \times 10^{11}$ | $8 \times 10^{10}$ |
| $[C_mH_{2m+1}-\underset{OH}{CH}-\underset{\underset{CH_3}{N}-CH_2-\underset{OH}{CH}-CH_2OH}{CH}-C_nH_{2n+1}]^+$  $CH_3SO_4^-$  m + n = 9 to 12 | $5 \times 10^{10}$ | $7 \times 10^{10}$ |
| $[CH_3-(CH_2)_9-\underset{OH}{CH}-CH_2-\underset{CH_3}{\overset{CH_3}{N}}-CH_2-\underset{OH}{CH}-CH_2OH]^+$  $Cl^-$ | $8 \times 10^8$ | $1 \times 10^9$ |
| $[CH_3-(CH_2)_9-\underset{OH}{CH}-CH_2-\underset{CH_3}{\overset{CH_3}{N}}-CH_2-\underset{OH}{CH}-CH_2OH]_2^{2+}$  $SO_4^{2-}$ | $4 \times 10^9$ | $3 \times 10^9$ |
| $[CH_3-(CH_2)_5-\underset{OH}{CH}-CH_2-\underset{CH_3}{\overset{CH_3}{N}}-CH_2-\underset{OH}{CH}-CH_2OH]^+$  $ClO_4^-$ | $6 \times 10^9$ | $1 \times 10^8$ |
| $[CH_3-(CH_2)_{9\,to\,11}\underset{OH}{CH}-CH_2$  $NO_3^- + [HOCH_2-\underset{OH}{CH}-CH_2-\underset{CH_3}{N}-CH_3$ | $2 \times 10^9$ | $2 \times 10^9$ |
| $\begin{bmatrix} C_mH_{2m+1}\underset{OH}{CH}-\underset{NH-CH_2-CHOH-CH_2OH}{CH}-C_nH_{2n+1} \\ \underset{CH_2-CHOH-CH_2OH}{\overset{CH_2}{\underset{NH_2}{\overset{CH_2}{|}}}} \end{bmatrix}^{2+}$  $(ClO_4)_2^{2-}$  n + m = 9 to 12 | $4 \times 10^9$ | $2 \times 10^9$ |
| $[CH_3-(CH_2)_9-\underset{OH}{CH}-CH_2-\underset{H}{\overset{CH_3}{N}}-CH_2-\underset{OH}{CH}-\underset{OH}{CH_2}]_2^{2+}$  $^-OOC-(CH_2)_4-COO^-$ | $8 \times 10^{10}$ | $3 \times 10^{10}$ |

EXAMPLE 3

Thirty parts of polymethyl methacrylate beads (Degalan LP 59/03 manufactured by Degussa) were dissolved in 70 parts of toluene and the solution treated each time with 0.15 parts of different antistatic agents according to the invention. The solution was then converted by a film drawing apparatus into a film of a thickness of 100 microns applied to a polytetrafluoroethylene plate and dried for two hours in a drying cabinet at 60° C. The antistatic activity was measured according to DIN 53482 both immediately and after 24 hours conditioning time at 45% relative humidity. The results are set forth in following Table 3.

Table 3

| Antistatic Agent | Surface Resistance (in Ohms) | |
|---|---|---|
| | As Formed | After Conditioning 24 hours at 45% Rel. Humidity |
| None | $3 \times 10^{14}$ | $2 \times 10^{14}$ |
| $[CH_3-(CH_2)_{9-11}-\underset{OH}{\underset{|}{CH}}-CH_2-\underset{\underset{CH_3}{|}}{\overset{\overset{CH_3}{|}}{N}}-CH_2-\underset{OH}{\underset{|}{CH}}-CH_2OH]^+ \; NO_3^-$ | $4 \times 10^9$ | $4 \times 10^9$ |
| $[CH_3-(CH_2)_9-\underset{OH}{\underset{|}{CH}}-CH_2-\underset{\underset{C_2H_5}{|}}{\overset{\overset{CH_3}{|}}{N}}-CH_2-\underset{OH}{\underset{|}{CH}}-CH_2OH]^+ \; CH_3SO_4^-$ | $6 \times 10^9$ | $1 \times 10^9$ |
| $[CH_3-(CH_2)_9-\underset{OH}{\underset{|}{CH}}-CH_2-\underset{\underset{CH(CH_3)_2}{|}}{\overset{\overset{CH_3}{|}}{N}}-CH_2-\underset{OH}{\underset{|}{CH}}-CH_2OH]^+ \; CH_3SO_4^-$ | $2 \times 10^9$ | $1 \times 10^{10}$ |
| $[CH_3-(CH_2)_9-\underset{OH}{\underset{|}{CH}}-CH_2-\underset{\underset{CH_3}{|}}{\overset{\overset{CH_3}{|}}{N}}-CH_2-\underset{OH}{\underset{|}{CH}}-CH_2OH]^+ \; NO_3^-$ | $3 \times 10^9$ | $3 \times 10^9$ |
| $[CH_3-(CH_2)_5-\underset{OH}{\underset{|}{CH}}-CH_2-\underset{\underset{CH_3}{|}}{NH}-CH_2-\underset{OH}{\underset{|}{CH}}-CH_2OH]^+ \; CH_3SO_4^-$ | $2 \times 10^{10}$ | $2 \times 10^9$ |
| $[C_mH_{2m+1}-\underset{OH}{\underset{|}{CH}}-\underset{\underset{CH_3}{\diagup}\;\underset{CH_3}{\diagdown}}{\overset{|}{N}}-C_nH_{2n+1}]^+ \; CH_3SO_4^-$ $\quad CH_2-\underset{OH}{\underset{|}{CH}}-CH_2OH$ <br> n + m = 9 to 12 | $4 \times 10^{10}$ | $1 \times 10^{10}$ |

In the analogous use of the antistatic agent

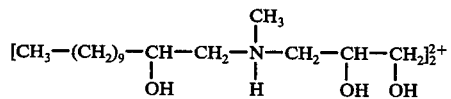

in polymethyl methacrylate in a concentration of 0.5 weight percent the surface resistance in the as-formed-condition was determined to be $1 \times 10^{12}$ ohms and after conditioning at 45% relative humidity $5 \times 10^{11}$ ohms.

EXAMPLE 4

In each case there was added to 100 parts of methyl methacrylate 0.5 part of an antistatic agent according to the invention and 0.5 parts of a dilauroyl peroxide hardener and the mixture cast between glass plates. The product was allowed to harden for four hours at 60° C and two hours at 100° C. After removal of the glass plates the antistatic effect was determined both immediately and after a conditioning time of 24 hours at 45% relative humidity. The measurements of the antistatic effects were carried out in the manner described above according to DIN 53482 and are collected in following Table 4.

Table 4

| Antistatic Agent | Surface Resistance (in Ohms) | |
|---|---|---|
| | As Formed | After Conditioning 24 hours at 45% Rel. Humidity |
| None | $4 \times 10^{14}$ | $2 \times 10^{14}$ |
| $[CH_3-(CH_2)_9-\underset{OH}{\underset{|}{CH}}-CH_2-\underset{\underset{CH_3}{|}}{NH}-CH_2-\underset{OH}{\underset{|}{CH}}-CH_2OH]^+ \; NO_3^-$ | $1 \times 10^{10}$ | $1 \times 10^{10}$ |
| $[CH_3-(CH_2)_9-\underset{OH}{\underset{|}{CH}}-CH_2-\underset{\underset{CH_3}{|}}{\overset{\overset{CH_3}{|}}{N}}-CH_2-\underset{OH}{\underset{|}{CH}}-CH_2OH]^+ \; NO_3^-$ | $8 \times 10^9$ | $8 \times 10^9$ |
| $[CH_3-(CH_2)_{9-11}-\underset{OH}{\underset{|}{CH}}-CH_2-\underset{\underset{CH_3}{|}}{\overset{\overset{CH_3}{|}}{N}}-CH_2-\underset{OH}{\underset{|}{CH}}-CH_2OH]^+ \; NO_3^-$ | $1 \times 10^{10}$ | $1 \times 10^{10}$ |

The antistatic agents of the invention are also very effective in lesser amounts in polyethylene as is shown in the following example.

EXAMPLE 5

In accordance with the procedure in "Use Example 1" there were produced test sheets from 100 parts by weight of high pressure polyethylene and 0.1 part by weight of antistatic agent. The results are set forth in following Table 5.

Table 5

| Antistatic Agent | Surface Resistance (in Ohms) | | |
|---|---|---|---|
| | As Formed | After Conditioning at 45% Rel. Humidity | |
| | | After 24 Hours | After 7 Days |
| N-Methyl-N-(2,3-dihydroxypropyl)-N-(2'-hydroxydodecyl)-amine | $5 \times 10^{11}$ | $7 \times 10^{10}$ | $8 \times 10^{9}$ |

EXAMPLE 6

One-hundred parts by weight of polyvinyl chloride (present as a 1:1 mixture of two types of polyvinyl chloride: Solvic® 333 of Deutsche Solvay-Werke, and Vinnol® P 70 of Wacker-Chemie), 60 parts of dioctyl phthalate plasticizer, 0.5 parts by weight of the tin stabilizer (Irgastab® 17 M of Ciba-Geigy A.G.), 0.3 parts by weight of stearic acid, 2.0 parts by weight of the lubricant (Bärolup LPL of Chemische Werke München, Otto Bärlocher GmbH) and 2.0 parts by weight of antistatic agent (as set forth in following Table 6) were worked into a polyvinyl chloride paste in the usual manner. The paste was then drawn into a 0.5 mm thick sheet on a glass plate and gelatinized for 15 minutes at 175° C in a circulatory oven. The results of the measurement of surface resistance are given in the following table.

Table 6

| Antistatic Agent | Surface Resistance (in Ohms) After 24 hours at 45% Rel. Humidity |
|---|---|
| $[\text{C}_{10}\text{H}_{21}-\underset{\text{OH}}{\text{CH}}-\text{CH}_2-\underset{\text{CH}_3}{\overset{\text{CH}_3}{\text{N}}}-\text{CH}_2-\underset{\text{OH}}{\text{CH}}-\underset{\text{OH}}{\text{CH}_2}]^+ \text{ClO}_4^-$ | $3 \times 10^{8}$ |
| $[\text{C}_{10}\text{H}_{21}-\underset{\text{OH}}{\text{CH}}-\text{CH}_2-\underset{\text{CH}_3}{\overset{\text{CH}_3}{\text{N}}}-\text{CH}_2-\underset{\text{OH}}{\text{CH}}-\underset{\text{OH}}{\text{CH}_2}]^+ \text{Cl}^-$ | $5 \times 10^{8}$ |
| $[\text{C}_{10}\text{H}_{21}-\underset{\text{OH}}{\text{CH}}-\text{CH}_2-\underset{\text{CH}_3}{\overset{\text{CH}_3}{\text{N}}}-\text{CH}_2-\underset{\text{OH}}{\text{CH}}-\underset{\text{OH}}{\text{CH}_2}]_2^{2+} \text{SO}_4^{--}$ | $1 \times 10^{8}$ |
| $[\text{C}_{10 \text{ to } 12}\text{H}_{21 \text{ to } 25}-\underset{\text{OH}}{\text{CH}}-\text{CH}_2-\underset{\text{CH}_3}{\overset{\text{CH}_3}{\text{N}}}-\text{CH}_2-\underset{\text{OH}}{\text{CH}}-\underset{\text{OH}}{\text{CH}_2}]^+ \text{ClO}_4^-$ | $2 \times 10^{8}$ |

EXAMPLE 7

In accordance with the procedure in "Use Example 1" there were produced test sheets from 100 parts by weight of polypropylene (Hostalen® PPN 1060 of Hoechst AG) and 0.5 parts by weight of antistatic agent. The results are set forth in following Table 7.

Table 7

| Antistatic Agent | Surface Resistance (in Ohms) | | |
|---|---|---|---|
| | As Formed | After Conditioning at 45% rel. Humidity | |
| | | After 24 Hours | After 7 Days |
| N-Methyl-N-(2,3-dihydroxypropyl)-N:(2'-hydroxydodecyl)-amine | $1 \times 10^{14}$ | $1 \times 10^{13}$ | $9 \times 10^{10}$ |

EXAMPLE 8

In accordance with the procedure in "Use Example 1" there were produced test sheets from 100 parts by weight of low pressure polyethylene (Lupolen® 6041D of BASF A.G.) and 0.5 parts by weight of antistatic agent. The results are set forth in following Table 8.

Table 8

| Antistatic Agent | Surface Resistance (in Ohms) | |
|---|---|---|
| | As Formed | After 24 hours Conditioning at 45% rel. Humidity |
| N-Methyl-N-(2,3-dihydroxypropyl)-N-(2'-hydroxydodecyl)-amine | $2 \times 10^{12}$ | $3 \times 10^{10}$ |

Production Of So-called Master Batches Containing Antistatic Agents

EXAMPLE 9a

Twenty-five kg of polyethylene powder (Lupolen® 2000H of BASF A.G.) were mixed for several minutes in a mixer with 1.31 kg of N-methyl-N-(2,3-dihydroxypropyl)-N-(2'-hydroxydodecyl)amine and 130 grams of a pyrogenic silica (Aerosil® 200 of Degussa). The mixture was extruded over a planet roll extruder. The strands obtained were granulated. The production of sheets and films showed that the antistatic agent was perfectly distributed. (The use of the silica can be omitted in a given case. By its presence, however, there can be improved the working in of the antistatic agent.)

Production Of An Antistatic Agent Containing High Pressure Polyethylene Film Using The Master Batch of Example 9a

EXAMPLE 9b

There were produced flms having a thickness of 50 microns from 19 parts by weight of high pressure polyethylene (Lupolen® 2430 H of BASF A.G.) and 1 part by weight of the master batch produced in Example 9a. The results of the measurement of resistance are set forth in Table 9 below.

Table 9

| Antistatic Agent | Content of Antistatic Agent in the Film in Weight Percent | Surface Resistance (in Ohms) | | |
|---|---|---|---|---|
| | | After Conditioning at 45% Rel. Humidity | | |
| | | As Formed | After 24 Hours | After 7 Days |
| N-Methyl-N(2,3-di-hydroxypropyl-N-(2'-hydroxydodecyl)-amine | 0.25 | $5 \times 10^{10}$ | $5 \times 10^9$ | $8 \times 10^8$ |
| For Comparison: Films Without Antistatic Agent | | $10^{14}$ | $5 \times 10^{13}$ | |

Examples of External Use Of The New Antistatic Agents

Example 10

Sheets of the size 300 × 300 × 1 mm were produced from high pressure polyethylene Lupolen 2000H of BASF A.G.) at 150° C within 8 minutes in a frame press. The sheets were produced between aluminum films in order to avoid any influence of an otherwise necessary parting agent.

For the external use of the antistatic agent there was first produced a stock solution in each case containing 20 grams of antistatic agent and a solvent mixture of isopropanol and twice distilled water in the ratio of 1:1 and filled to 100 ml. For the production of a 1% solution there were withdrawn 50 ml of the stock solution and filled up to 1000 ml with twice distilled water. For a 0.1% solution 5 ml of the stock solution were correspondingly filled up to 1000 ml.

There were dipped into the 1.0% and 0.1% solutions 5 test articles of high pressure polyethylene for the measurement according to DIN 53482, drained and allowed to dry hanging free longitudinally in air. The measurements were made after 6 hours drying at 65% relative humidity and 20° C. The results are shown in following Table 10.

Table 10

| Antistatic Agent | Content of Antistatic Agent in the Solution in Percent (see above) | Surface Resistance (in Ohms) |
|---|---|---|
| N-Methyl-N-(2,3-dihydroxypropyl)-N-(2'-hydroxydodecyl)-amine | 1.0 | $5 \times 10^9$ |
| | 0.1 | $8 \times 10^{10}$ |

The compositions can comprise, consist essentially of or consist of the materials set forth.

What is claimed is:

1. A compound having the formula

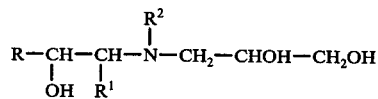

R and $R^1$ are both alkyl groups in which the sum of the carbon atoms in the two alkyl groups is 4 to 30 carbon atoms, $R^2$ is 2-hydroxyethylamino $C_2$ to $C_6$ alkyl, 2-hydroxypropylamino $C_2$ to $C_6$ alkyl, or 2,3-dihydroxypropylamino $C_2$ to $C_6$ alkyl.

* * * * *